US009866050B2

(12) United States Patent
Brandt et al.

(10) Patent No.: US 9,866,050 B2
(45) Date of Patent: Jan. 9, 2018

(54) BATTERY CELL CHARGE EQUALIZATION (75) Inventors: Randy L. Brandt, Orange, CA (US); Daniel I. Taira, Fountain Valley, CA (US)

(73) Assignee: THE BOEING COMPANY, Chicago, IL (US)

(*) Notice: Subject to any disclaimer, the term of this patent is extended or adjusted under 35 U.S.C. 154(b) by 2152 days.

(21) Appl. No.: 12/785,285

(22) Filed: May 21, 2010

(65) Prior Publication Data

US 2015/0380952 A1 Dec. 31, 2015

(51) Int. Cl.
*H02J 7/00* (2006.01)
*H01M 10/44* (2006.01)
*H01M 10/48* (2006.01)

(52) U.S. Cl.
CPC ........... *H02J 7/007* (2013.01); *H01M 10/441* (2013.01); *H01M 10/482* (2013.01); *H02J 7/0016* (2013.01); *H02J 7/0019* (2013.01); *H02J 7/0021* (2013.01); *H02J 7/0052* (2013.01)

(58) Field of Classification Search
CPC ..................................................... H02J 7/0014
USPC .................................. 320/116–122, 124, 127
See application file for complete search history.

(56) References Cited

U.S. PATENT DOCUMENTS

| 4,238,721 | A | * | 12/1980 | DeLuca et al. | 320/122 |
|---|---|---|---|---|---|
| 6,150,795 | A | * | 11/2000 | Kutkut et al. | 320/118 |
| 6,194,869 | B1 | * | 2/2001 | Peterzell | 320/134 |
| 6,388,424 | B1 | * | 5/2002 | Hidaka et al. | 320/122 |
| 6,873,134 | B2 | | 3/2005 | Canter et al. | |
| 8,183,870 | B1 | * | 5/2012 | Davies | 324/434 |
| 2002/0024319 | A1 | * | 2/2002 | Haraguchi et al. | 320/122 |
| 2003/0214267 | A1 | | 11/2003 | Long | |
| 2005/0258805 | A1 | * | 11/2005 | Thomas et al. | 320/134 |
| 2006/0046104 | A1 | | 3/2006 | Zimmerman | |
| 2006/0087287 | A1 | | 4/2006 | Thrap | |
| 2009/0079390 | A1 | * | 3/2009 | Choi et al. | 320/122 |

(Continued)

FOREIGN PATENT DOCUMENTS

| JP | 2002353786 A | 12/2002 |
|---|---|---|
| JP | 200439333 A | 5/2004 |

OTHER PUBLICATIONS

Ershag, Master's Thesis—A Balancing and Monitoring System for Battery Cell Stacks in Electrical Vehicles, Luleå University of Technology, 2008 (56 pgs).

(Continued)

*Primary Examiner* — Edward Tso
*Assistant Examiner* — Ahmed Omar
(74) *Attorney, Agent, or Firm* — Toler Law Group, PC (57) ABSTRACT

Battery cell charge equalization devices, systems and methods are provided. A particular method includes receiving a charging current at a battery charge equalization circuit coupled to a battery cell of a multi-cell battery. The method also includes routing at least a portion of the charging current away from the battery cell when a voltage of the battery cell satisfies a first voltage threshold. The method further includes establishing a second voltage threshold in response to the voltage of the battery cell satisfying the first voltage threshold. The second voltage threshold is lower than the first voltage threshold. The charging current is routed away from the battery cell while the voltage of the battery cell satisfies the second voltage threshold.

20 Claims, 6 Drawing Sheets

(56) References Cited

U.S. PATENT DOCUMENTS

2009/0102421 A1* 4/2009 Imai .............................. 320/118
2010/0188048 A1* 7/2010 Nishino et al. ............... 320/120

OTHER PUBLICATIONS

TL1431 Precision Programmable Reference, Texas Instruments Incorporated, SLVS062L—Dec. 1991—Revised Oct. 2007 (26 pgs).
International Search Report and Written Opinion of the International Searching Authority, International Application No. PCT/US2011/033328, European Patent Office, Sep. 5, 2011, (12 pgs).
Decision of Rejection; dated Feb. 24, 2015; Japanese Application No. 2013-511169 (English Translation), 2 pages.

* cited by examiner

BATTERY CELL CHARGE EQUALIZATION

FIELD OF THE DISCLOSURE

The present disclosure is generally related to battery cell charge equalization devices, systems and methods.

BACKGROUND

Batteries may be made up of multiple cells in series in order to achieve higher operating voltages. Production tolerances, uneven temperature distribution, differences in the aging characteristics of particular cells, or other differences between the cells can cause decreased performance or premature failure of a battery. For example, during a charging cycle, if the battery has a degraded cell (that is, a cell with a diminished capacity), after the degraded cell has reached its full charge, it may be subject to overcharging until the rest of the cells of the battery reach their full charge. Overcharging the cell may lead to temperature and pressure build up in the cell and may cause damage to the cell, the battery, or even other nearby devices. During discharging, the weakest cell in the battery may have the greatest depth of discharge (i.e., lowest state of charge) and therefore may be completely discharged before the other cells. Generally, once a single cell of a battery has failed, the entire battery must be replaced, which can be expensive and time consuming.

SUMMARY

Battery cell charge equalization devices, systems and methods are provided. Battery cell charge equalization may be used to improve performance (e.g., to deliver as much energy as possible during discharge) and to extend the cycle life of a multi-cell battery by reducing differences in energy stored in each cell of the battery. A battery cell charge equalization circuit may sense a battery cell's charge level during charging of the battery. If the cell's voltage, which is a measure of the state of charge (SOC) of the cell, exceeds a preset threshold, the circuit diverts (e.g., shunts) excess charging current away from the cell. For example, the charging current may be diverted into a lossy circuit element to limit recharging of the cell. The battery cell charge equalization circuit may provide a precise hysteresis of a voltage or SOC threshold in order to reduce irregular noise trips. The battery cell charge equalization circuit may also be used to monitor the cell's SOC by coupling the circuit to a detector circuit. The threshold and the hysteresis of the threshold may be selected to provide charging current diversion or sensing output at desired SOC levels.

In a particular embodiment, a battery system includes a battery with a plurality of battery cells coupled in series. The battery system includes first circuitry to monitor a voltage of a first battery cell. When a charging current is applied to the battery, the first circuitry routes at least a portion of the charging current to bypass the first battery cell in response to the voltage of the first battery cell satisfying a first voltage threshold. The first circuitry establishes a second voltage threshold in response to the voltage of the first battery cell satisfying the first voltage threshold. The battery system also includes second circuitry to monitor the voltage of the first battery cell. When the charging current is applied to the battery, the second circuitry generates a monitor output in response to the voltage of the first battery cell satisfying a third voltage threshold. The third voltage threshold is higher than the first voltage threshold.

A particular method includes receiving a charging current at a battery charge equalization circuit coupled to a battery cell of a multi-cell battery. The method also includes routing at least a portion of the charging current away from the battery cell when a voltage of the battery cell satisfies a first voltage threshold. The method further includes establishing a second voltage threshold in response to the voltage of the battery cell satisfying the first voltage threshold. The second voltage threshold is lower than the first voltage threshold. The charging current is routed away from the battery cell while the voltage of the battery cell satisfies the second voltage threshold.

In a particular embodiment, a battery cell charge equalization device includes a voltage reference device coupled to a battery cell. The voltage reference device enables current flow through a first circuit path when a voltage of the battery cell satisfies a first voltage threshold. The battery cell charge equalization device also includes a first switching device coupled to the first circuit path. The first switching device is activated by the current flow through the first circuit path to enable current flow through a second circuit path. The current flow through the second circuit path causes a second voltage threshold to be established. The second voltage threshold is different than the first voltage threshold (e.g., the second voltage threshold may be lower than the first voltage threshold). The battery cell charge equalization device also includes a second switching device coupled to the first circuit path. The second switching device is activated by the current flow through the first circuit path to activate a third circuit path. The third circuit path routes at least a portion of a charging current away from the battery cell.

The features, functions, and advantages that have been described can be achieved independently in various embodiments or may be combined in yet other embodiments, further details of which are disclosed with reference to the following description and drawings.

DETAILED DESCRIPTION

Battery cell charge equalization devices, systems and methods are depicted. Battery cell charge equalization may be used to improve performance (e.g., to deliver more energy during discharge) and to extend the cycle life of a multi-cell battery by reducing differences in energy stored in each cell of the battery. Battery cell charge equalization may be performed using a passive approach (e.g., a bypass approach) or an active approach (e.g., energy redistribution). Various embodiments disclosed herein use a passive, bypass approach to equalize charge between cells of a battery.

The performance and lifecycle of a multi-cell battery can be degraded by unequal charging of the cells of the battery.

For example, during use (i.e., discharge) of the battery, an amount of power that can be usefully discharged from the battery may be limited by a cell with the lowest state of charge (SOC). However, during charging of the battery, the amount of power than can be stored in the battery may be limited by a cell having the highest SOC. Thus, when the cells of the battery are not balanced, less power can be stored in or discharged from the battery than would be the case for the same battery when the cells are balanced. Additionally, without equalization, the cells may tend to diverge further during use, limiting the useful life of the battery.

One way that battery cell charge equalization may be addressed for certain batteries is to overcharge all of the cells. In certain batteries, losses increase as the cells are charged to higher states of charge. These increasing losses tend to help equalize the cells. However, other batteries, such as modern lithium-ion batteries, typically should not be overcharged for balancing, since losses in these batteries do not increase as the cells are charged to higher states of charge. Such batteries can suffer degradation if the cells are overcharged. Further, certain batteries cannot be discharged below a minimum level without causing degradation.

As described above, maximum charging may be limited by the highest SOC cell and maximum discharge may be constrained by the lowest SOC cell. A battery cell charge balancing system may be adapted to sense or take action based on battery cell charge equalization to mitigate recharge of a cell or of the battery. For example, when a cell's voltage (a measure of the cell's SOC) exceeds a predetermined value, the battery cell charge balancing system may divert (e.g., shunt) excess charging current away from the cell and into a lossy circuit element to limit recharge. In order to reduce irregular noise trips, the battery cell charge equalization system may provide for threshold hysteresis with respect to applying the charging current to the cell and diverting the charging current away from the cell. For example, when a first voltage threshold is reached, charging current may be diverted and the charging current may continue to be diverted until the cell's voltage drops below a second (lower) voltage threshold. A battery cell charge equalization system may also be used to monitor the cell SOC, the battery SOC, or both, by connecting a battery cell charge equalization circuit to a threshold detection system.

Certain circuits that have been proposed to perform battery cell charge equalization have used a zener diode as both a voltage reference and as a shunt. In these circuits, a zener diode may be attached to each cell of a battery. Generally, to function properly, the zener diodes used for each cell of the battery should be matched, which can be problematic. Additionally, zener diodes sometimes have reliability problems. In particular, zener diodes may fail short, which can destroy a cell to which a shorted zener diode is attached and may consequently destroy the entire battery. Additionally, since the zener diodes do not provide hysteresis, the zener diode circuits may be susceptible to nuisance noise trips. For example, when a cell is being charged and the voltage of the cell reaches a voltage threshold, the zener diode may dissipate charging current. However, dissipating the charging current may cause the voltage of the cell to drop below the voltage threshold, causing the zener diode to apply the charging current to the cell again. Since the voltage threshold to apply the charging current is the same as the voltage threshold to dissipate the charging current, applying and dissipating the charging current may repeat cyclically. Additionally, zener diode circuits may not provide a way to monitor the SOC of the cells or of the battery.

Another, passive, battery cell charge equalization system that has been proposed includes appropriately sized resistors in parallel with each cell. The resistors may provide linearly rising losses with increasing cell voltage. However, this system may cause the battery to discharge through the resistors when the battery is not in use, which can reduce the usefulness of the battery and can cause the battery to be damaged by becoming fully discharged. Additionally, the parallel resistors may provide for relatively slow rebalancing of the cells of the battery.

Active battery cell equalization systems have also been proposed. For example, an active battery cell equalization system may transfer energy from highly charged cells to less charged cells. Active battery cell equalization systems may use significant active electronic circuitry in order to perform the battery cell charge equalization functionality. Accordingly, active battery cell equalization systems can be complex, large and expensive.

Particular embodiments disclosed herein can use commonly available integrated circuits and discrete components to provide fast, reliable detection of the state of charge (SOC) of battery cells and, at the same time, eliminate nuisances associated with noisy output signals for monitoring and cell charge equalization shunt circuits. A particular battery cell charge equalization circuit includes a reference in association with a reference amplifier. A resistor divider sets a first threshold that is proportional to the reference of the reference amplifier. A switching element (e.g., a transistor) is used to set a second threshold that is lower than the first threshold. The second threshold may provide noise-mitigation and detection threshold hysteresis. An output circuit may be responsive to the reference amplifier. For example, the output circuit may provide a current shunting path to augment cell balancing in response to the reference amplifier. In another example, the output circuit may provide a signal to indicate a SOC of the cell responsive to the reference amplifier.

In a particular embodiment, the reference amplifier may include a silicon band-gap integrated circuit, such as the TL1431 precision programmable reference available from Texas Instruments Incorporated. The reference amplifier may have two preset or predetermined detection thresholds that are separated in voltage, which may represent, for example, a high SOC of a cell and a low SOC of the cell. The reference amplifier may be a high-precision reference amplifier, since every 10 mV may represent about 1% of the SOC of the cell.

When a battery cell charge equalization circuit is used for each cell of a multi-cell battery, e.g., a lithium-ion cell battery system, shunting charging current over multiple charge/discharge cycles may cause lower SOC cells to increase their charge levels to more closely match the higher SOC cells, thereby substantially equalizing or leveling the SOC of the cells. Each of the battery cell charge equalization circuits may also be provided with a switch that supports storage of the battery without parasitic discharge of the cell through the battery charge equalization circuits. The switch may also reduce "hot mate" concerns.

Figure 1:
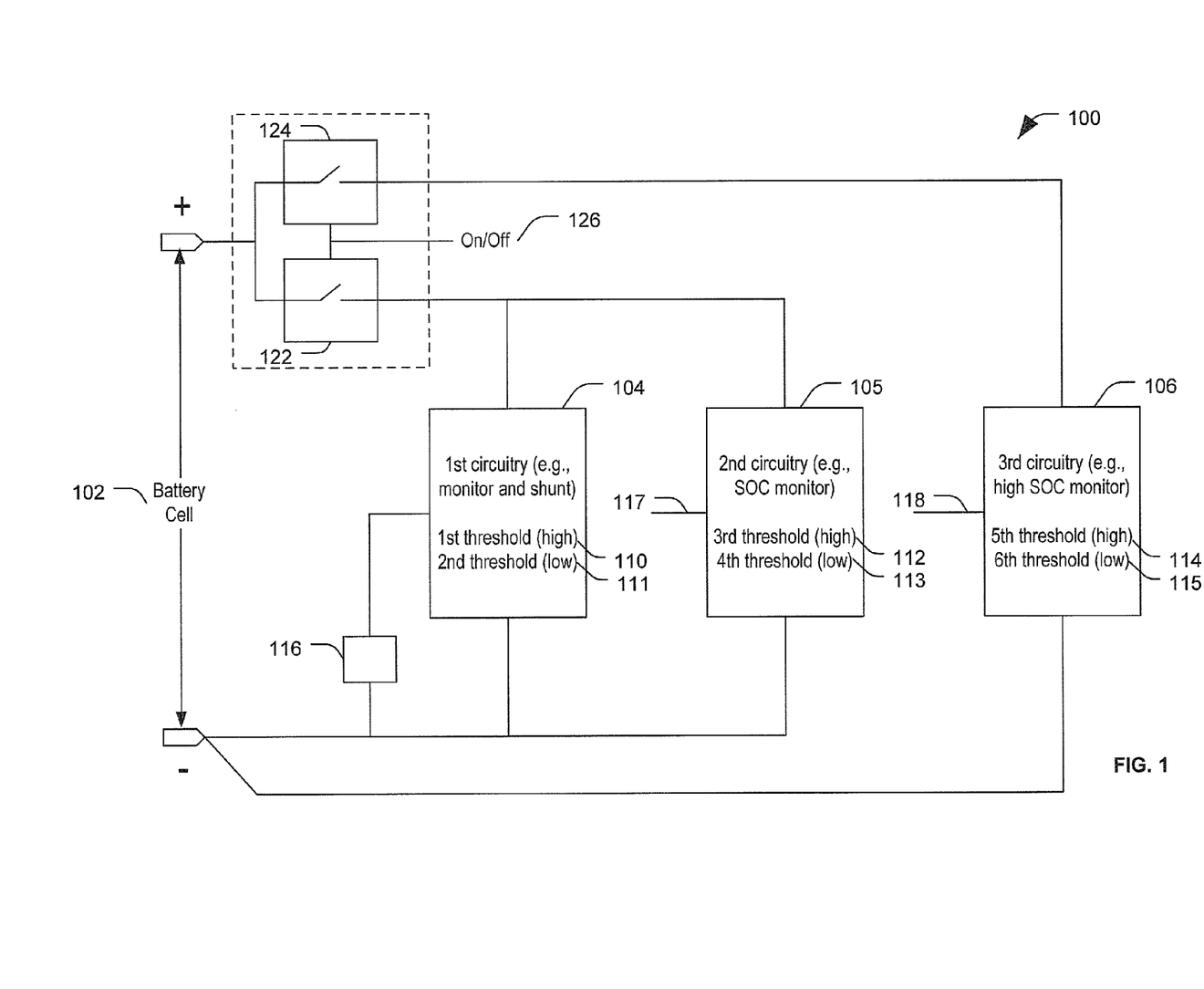
FIG. 1 is a diagram of a first particular embodiment of a battery cell charge equalization system.

FIG. 1 is a diagram of a first particular embodiment of a battery cell charge equalization system, generally designated 100. The system 100 includes or is coupled to a battery cell 102 having a positive terminal and a negative terminal. The battery cell 102 may be one cell of a multi-cell battery. For example, the battery cell 102 may be coupled in series with one or more other battery cells (not shown in FIG. 1) to provide a desired output voltage to a load.

The system 100 may include one or more equalizing circuits to facilitate battery cell charge equalization between cells of a multi-cell battery. For example, the equalizing circuits may include first circuitry 104, second circuitry 105, third circuitry 106, or any combination thereof. In FIG. 1, the circuitry 104-106 is illustrated as functional blocks; however, the circuitry 104-106 may be provided in various form factors or implementations. For example, the circuitry 104-106 may be provided as one or more modules (i.e., discrete packaged components) that can be coupled individually or as a unit, to the battery cell 102. In another example, the circuitry 104-106 may be provided as one or more circuit boards that can be coupled to the battery cell 102. In another example, the circuitry 104-106 may be provided within a multi-cell battery as a component of the multi-cell battery.

In a particular embodiment, the first circuitry 104 may function as a monitor and shunt circuit. That is, the first circuitry 104 may monitor a voltage of the battery cell 102 and may route at least a portion of a charging current away from the battery cell 102 when the detected voltage of the cell satisfies a particular voltage threshold. In an illustrative embodiment, the first circuitry 104 may have a first voltage threshold 110 and a second voltage threshold 111. The second voltage threshold 111 may be different than the first voltage threshold 110. For example, the second voltage threshold 111 may be lower than the first voltage threshold 110. This difference in the first voltage threshold 110 and the second voltage threshold 111 provides hysteresis that may reduce nuisance switching of the first circuitry 104.

For example, when the voltage of the battery cell 102 satisfies (e.g., is greater than or is greater than or equal to) the first voltage threshold 110, a portion of the charging current may be routed to a shunt 116. This may reduce the amount of charging current applied to the battery cell 102, allowing other battery cells of the battery to catch up to the state of charge (SOC) of the battery cell 102. For example, routing the charging current away from the battery cell 102 may reduce a rate at which the SOC of the battery cell 102 increases. Other battery cells that have a lower SOC and that continue to receive the full charging current (i.e., the charging current is not routed away from these lower SOC battery cells) charge at a higher rate. Thus, the SOC of the lower SOC battery cells can catch up to the SOC of the battery cell 102.

When the portion of the charging current is routed to the shunt 116, the voltage of the battery cell 102 may drop somewhat. To reduce the likelihood that such a drop in the voltage of the battery cell 102 would cause the first circuitry 104 to turn off the shunt 116 (i.e., to apply the full charging current to the battery cell 102) the first circuitry 104 may use the second threshold 111 to control deactivation of the shunt 116. That is, the portion of the charging current may be routed to the shunt 116 while the second threshold 111 is satisfied (even when the first voltage threshold 110 is no longer satisfied). To illustrate, for a particular embodiment, the first voltage threshold 110 may be about 4.05V and the second voltage threshold 111 may be about 4.00V. In this embodiment, the shunt 116 may be activated when the voltage of the battery cell 102 reaches 4.05V. Additionally, when the voltage of the battery cell 102 reaches 4.05V, the second threshold 111 may be activated. Thus, the shunt 116 may remain activated unless the voltage of the battery cell 102 drops below 4.00V. In a particular embodiment, when the shunt 116 is activated, a charge of about C/500 (where C refers to a capacity of the cell, typically measured in ampere-hours or milliamp-hours) may be diverted away from the battery cell 102 and dissipated in a lossy element of the shunt 116. The first circuitry 104 may cease to route the portion of the charging current to bypass the battery cell 102 (e.g., to the shunt 116) in response to the voltage of the first battery cell 102 ceasing to satisfy the second voltage threshold 111. For example, after the voltage of the battery cell 102 ceases to satisfy the second voltage threshold (e.g., during use or storage of the battery), the first voltage threshold 110 is reactivated and the second voltage threshold 111 is deactivated.

In a particular embodiment, the second circuitry 106 may function as a monitor circuit. That is, the second circuitry 105 may generate a monitor output 117 based on the voltage of the battery cell 102 when the voltage satisfies a particular voltage threshold. In an illustrative embodiment, the second circuitry 105 may have a third voltage threshold 112 and a fourth voltage threshold 113. The fourth voltage threshold 113 may be different than the third voltage threshold 112. For example, the fourth voltage threshold 113 may be lower than the third voltage threshold 112. This difference in the third voltage threshold 112 and the fourth voltage threshold 113 provides hysteresis that may reduce nuisance switching of the monitor output 117.

For example, when the voltage of the battery cell 102 satisfies (e.g., is greater than or is greater than or equal to) the third voltage threshold 112, the monitor output 117 may be generated to indicate that the battery cell 102 is fully charged. The monitor output 117 may be provided to a monitoring system (not shown) that may discontinue charging the battery (e.g., discontinue the charging current) when the monitor output 117 is received or in response to other conditions, such as output from circuitry associated with a predetermined number of battery cells indicating that battery cells are fully charged.

When the monitor output 117 is generated, a portion of the charging current is routed away from the battery cell 102 to provide the monitor output 117. Accordingly, the voltage of the battery cell 102 may drop somewhat in response to the monitor output 117 being generated. To reduce the likelihood that such a drop in the voltage of the battery cell 102 would cause the monitor output 117 to turn off, the second circuitry 105 may use the fourth threshold 113 to control deactivation of the monitor output 117. That is, the monitor output 117 is generated while the fourth threshold 113 is satisfied. To illustrate, for a particular embodiment, the third voltage threshold 112 may be about 4.10V and the fourth voltage threshold 113 may be about 4.05V. In this embodiment, the monitor output 117 may be activated when the voltage of the battery cell 102 reaches 4.10V. Additionally, when the voltage of the battery cell 102 reaches 4.10V, the fourth threshold 113 may be activated. Thus, the monitor output 117 may remain activated unless the voltage of the battery cell 102 drops below 4.05V.

In a particular embodiment, the third circuitry 106 may function as an overcharge monitor circuit. That is, the third circuitry 106 may generate a second monitor output, such as an overcharge output 118, based on the voltage of the battery cell 102 when the voltage satisfies a particular voltage threshold.

In an illustrative embodiment, the third circuitry 105 may have a fifth voltage threshold 114 and a sixth voltage threshold 115. The sixth voltage threshold 115 may be established or activated in response to the fifth voltage threshold 114 being satisfied. The sixth voltage threshold 115 may be different than the fifth voltage threshold 114. For example, the sixth voltage threshold 115 may be lower than the fifth voltage threshold 114. This difference in the fifth voltage threshold 114 and the sixth voltage threshold 115 provides hysteresis that may reduce nuisance switching of the overcharge output 118.

For example, when the voltage of the battery cell 102 satisfies (e.g., is greater than or is greater than or equal to) the fifth voltage threshold 114, the overcharge output 118 may be generated to indicate that the battery cell 102 is overcharged or at risk of being overcharged. The overcharge output 118 may be provided to a monitoring system (not shown) that may discontinue charging the battery when the overcharge output 118 is received or in response to other conditions, such as receiving an overcharge output from circuitry associated with a number of battery cells of a battery.

When the overcharge output 118 is generated, a portion of the charging current is routed away from the battery cell 102 to provide the overcharge output 118. Accordingly, the voltage of the battery cell 102 may drop somewhat in response to the overcharge output 118 being generated. To reduce the likelihood that such a drop in the voltage of the battery cell 102 would cause the overcharge output 118 to turn off, the third circuitry 106 may use the sixth threshold 115 to control deactivation of the overcharge output 118. To illustrate, for a particular embodiment, the fifth voltage threshold 114 may be about 4.30V and the sixth voltage threshold 115 may be about 4.10V. In this embodiment, the overcharge output 118 may be activated when the voltage of the battery cell 102 reaches 4.30V. Additionally, when the voltage of the battery cell 102 reaches 4.30V, the sixth threshold 115 may be activated. Thus, the overcharge output 118 may remain activated unless the voltage of the battery cell 102 drops below 4.10V.

The system 100 may also include one or more switches, such as a first switch 122 and a second switch 124. The first switch 122 may be operable to reduce discharge of the battery cell 102 through the first circuitry 104 and the second circuitry 105 after charging of the battery is complete. The second switch 124 may be operable to reduce discharge of the battery cell 102 through the third circuitry 106 after charging of the battery is complete. The switches 122, 124 may have an off (i.e., open) leakage current that is less than a self discharge rate of the battery cell 102. For example, for certain lithium-ion battery cells the self discharge rate may be about C/100000. Thus, the switches 122, 124 may have an off leakage current of less than C/100000. An on/off switch control 126 may enable the system 100 to be turned on (by closing the switches 122, 124) to feed power from the battery cell 102 to circuit elements of the system 100. In a particular embodiment, the second switch 124 may be used to power the third circuitry 106 and the first switch 122 may be used to power the first circuitry 104 and the second circuitry 105.

During charging of the battery cell 102, the battery cell 102 is attached to the circuitry 104-106 and the switches 122, 124 are closed. When the voltage of the battery cell 102 satisfies the first voltage threshold 110, the first circuitry 104 directs charging current away from the battery cell 102 to the shunt 116. In a particular embodiment, the shunt 116 bleeds a discharge current on the order of C/500 from the battery cell 102. Additionally, in response to the voltage of the battery cell 102 satisfying the first voltage threshold 110, the first circuitry 104 establishes or activates the second voltage threshold 111 to avoid nuisance trips of the shunt 116. To illustrate, when the first voltage threshold 110 is 4.05V, the second voltage threshold 111 may be about 4.00V to provide 0.05V of threshold hysteresis.

Because the battery cell 102 is attached to a charging current, the voltage of the battery cell 102 continues to rise even while the shunt 116 is active. The voltage of the battery cell 102 may rise until the third voltage threshold 112 is satisfied. When the third voltage threshold 112 is satisfied, the monitor output 117 may be activated. The monitor output 117 may indicate that the SOC of the battery cell 102 is nearly full. Activation of the monitor output 117 may signal a charger coupled to the battery to reduce or to cease charging. Additionally, in response to the voltage of the battery cell 102 satisfying the third voltage threshold 112, the second circuitry 105 establishes or activates the fourth voltage threshold 113 to avoid nuisance trips of the monitor output 117. To illustrate, when the third voltage threshold 112 is 4.10V, the fourth voltage threshold 113 may be about 4.05V to provide 0.05V of threshold hysteresis.

When the charging current to the battery cell 102 does not respond to the monitor output 117, the third circuitry 106 may act as a protection monitor to indicate that the battery cell 102 is approaching a harmful charge state (e.g., approaching an overcharge state). To illustrate, when the fifth voltage threshold 114 is satisfied, the overcharge output 118 may be activated. The overcharge output 118 may indicate that the SOC of the battery cell 102 is at or approaching a harmful state. Activation of the overcharge output 118 may signal the charger to initiate battery protection procedures, e.g., to disconnect the battery from the charger. Additionally, in response to the voltage of the battery cell 102 satisfying the fifth voltage threshold 114, the third circuitry 106 establishes or activates the sixth voltage threshold 115 to avoid nuisance trips of the overcharge output 118. To illustrate, when the fifth voltage threshold 114 is 4.30V, the sixth voltage threshold 115 may be about 4.10V to provide 0.2V of threshold hysteresis.

The battery cell charge equalization system 100, when not activated (e.g., while the battery is in storage) may pass a current that is less than a self-discharge rate of the battery cell 102. For example, the self-discharge rate of the battery cell may be about C/100000 in a 2.8V to 3.0V range where the battery cell is fully discharged. When the battery cell charge equalization system 100 is activated (e.g., during charging of the battery), the battery cell charge equalizing system 100 may pass currents on the order of C/500 at a maximum expected battery cell operating voltage (e.g., around 4.1V, in some embodiments). In a particular embodiment, the maximum current carrying capability of the battery cell charge equalization system 100 is about C/500, which corresponds to about 100 mA for a 50 Ah battery cell and about 26 mA for a 13 Ah battery cell. Maximum power dissipation at 4.1V, based on a current of about C/500, may be about 410 mW for a 50 Ah battery cell and about 107 mW for a 13 Ah battery cell. The battery cell charge equalization system 100 may be operable throughout an operating temperature range of the battery. For example, the battery cell charge equalization system 100 may be operable over a temperature range of at least −10° C. to 50° C., which covers the typical maximum operating temperature range of a lithium-ion battery cell with about a 10° C. margin.

Figure 2:
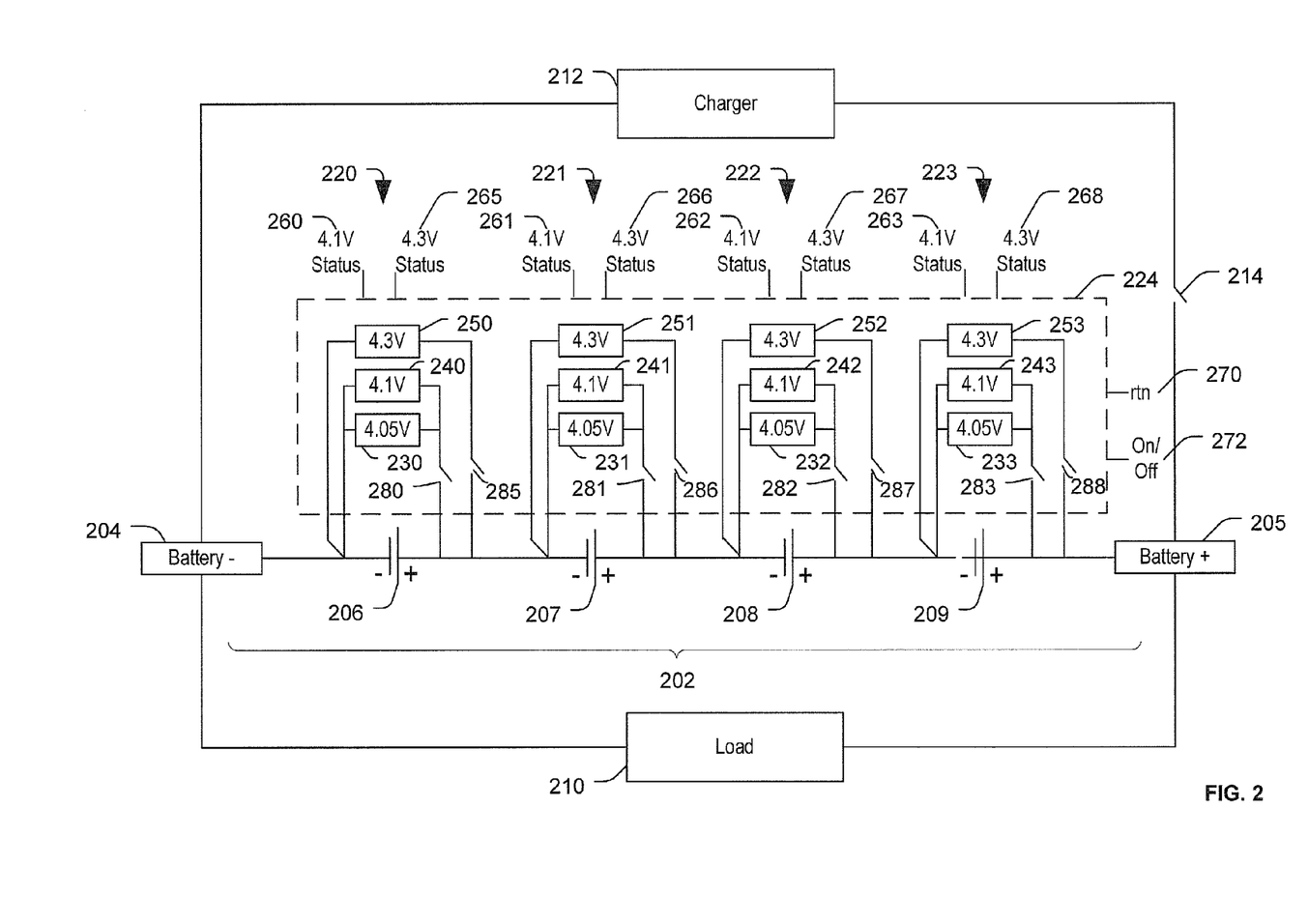
FIG. 2 is a diagram of a particular embodiment of battery system.

FIG. 2 is a diagram of a particular embodiment of a battery system. FIG. 2 illustrates a battery 202 having a plurality of battery cells 206-209 coupled in series. In a particular embodiment, the battery 202 is a lithium-ion battery. In other embodiments, the battery 202 is of another type, such as a lead acid battery, a nickel cadmium battery, a nickel metal hydride battery, a lithium-ion polymer battery, or another type of rechargeable battery. Additionally, although the battery 202 is illustrated in FIG. 2 with four battery cells 206-209, the battery 202 may have more or fewer battery cells depending on the specific implementation.

In FIG. 2, the battery 202 is coupled to a load 210 via a positive terminal 205 and a negative terminal 204. The load 210 may be any device or system that is powered using the battery 202. For example, the load 210 may include a battery powered portable device, such as an electronic device or tool. In another example, the load 210 may include a motor or other system of a vehicle, such as a satellite or an electric or hybrid electric aircraft or automobile. In still another example, the load 210 may include a power distribution system where the battery 202 is used to store power for distribution.

The battery 202 may be coupled to a charger 212. The charger 212 may provide a charging current to the battery 202 to recharge the battery cells 206-209. As described above, unequal charging of the battery cells 206-209 may reduce the performance of the battery 202 or may shorten the useful life of the battery 202. Accordingly, the battery cells 206-209 may be coupled to a battery cell charge equalization system 224. The battery cell charge equalization system 224 may include battery cell charge equalization circuits coupled to each of the battery cells 206-209. For example, a first battery cell charge equalization circuit 220 may be coupled to a first battery cell 206, a second battery cell charge equalization circuit 221 may be coupled to a second battery cell 207, a third battery cell charge equalization circuit 222 may be coupled to a third battery cell 208, and a fourth battery cell charge equalization circuit 223 may be coupled to a fourth battery cell 209.

The battery cell charge equalization circuits 220-223 may include circuitry to implement various functions, such as passive battery cell charge equalization, battery cell state of charge (SOC) monitoring, and battery cell overcharge monitoring. For example, the battery cell charge equalization circuits 220-223 may include first circuitry 230-233 to facilitate leveling or equalization of SOC between the battery cells 206-209. To illustrate, each circuit of the first circuitry 230-233 may include the first circuitry 104 and the shunt 116 of FIG. 1. In an illustrative embodiment, the first circuitry 230-233 may route a charging current received from the charger 212 away from a corresponding battery cell when the voltage of the corresponding battery cell reaches a first voltage threshold (e.g., 4.05V). The first circuitry 230-233 may also activate a second voltage threshold (e.g., 4.00V) in response to the first voltage threshold being satisfied. For example, during charging, when the first battery cell 206 reaches the first voltage threshold, at least a portion of the charging current may be shunted away from the first battery cell 206 by the first circuitry 230 of the first battery charge equalization circuit 220. Routing at least a portion of the charging current away from the first battery cell 206 while the charging current is still applied to the other battery cells 207-209 may allow the other battery cells 207-209 to catch up to the SOC of the first battery cell 206.

The battery cell charge equalization circuits 220-223 may also include second circuitry 240-243 to facilitate monitoring the SOC of the battery cells 206-209. To illustrate, each circuit of the second circuitry 240-243 may include the second circuitry 105 of FIG. 1. In an illustrative embodiment, the each circuit of the second circuitry 240-243 may generate an output 260-263 indicating that an associated battery cell has reached a target SOC (e.g., that the corresponding battery cell is substantially fully charged) when the voltage of the associated battery cell reaches a third voltage threshold (e.g., 4.10V). The second circuitry 240-243 may also activate a fourth voltage threshold (e.g., 4.05V) in response to the third voltage threshold being satisfied. For example, during charging, when the fourth battery cell 209 reaches the third voltage threshold, the output 263 may be activated to provide a charging status signal. The charging status signal may be routed to a monitoring or control system which may cause the charger 212 to reduce or turn off the charging current.

The battery cell charge equalization circuits 220-223 may include third circuitry 250-253 to facilitate overcharge monitoring of the battery cells 206-209. To illustrate, each circuit of the third circuitry 250-253 may include the third circuitry 106 of FIG. 1. In an illustrative embodiment, the third circuitry 250-253 may generate an overcharge output 265-268 indicating that an associated battery cell is at or is nearing a harmful SOC (e.g., that the associated battery cell is overcharged or is approaching an overcharged state) when the voltage of the associated battery cell reaches a fifth voltage threshold (e.g., 4.30V). The third circuitry 250-253 may also activate a sixth voltage threshold (e.g., 4.10V), in response to the fifth voltage threshold being satisfied. For example, during charging, when the fourth battery cell 209 reaches the fifth voltage threshold, the overcharge output 268 may be activated to provide an overcharge signal. The overcharge signal may be routed to a monitoring or control system which may take steps to prevent harmful overcharging of the battery cells 206-209. For example, the monitoring or control system may shut down the charger 212 or electrically disconnect the battery 202 from the charger 212.

The thresholds used for one battery cell charge equalization circuit, e.g., the first battery cell charge equalization circuit 220, may be the same as or different than the thresholds used by the other battery cell charge equalization circuits, e.g., the second, third and fourth battery cell charge equalization circuits 221-223. For example, during charging of the battery 202, the first circuitry 230 of the first battery cell charge equalization circuit 220 may use the first threshold to direct a portion of the charging current away from the first battery cell 206 and to activate the second threshold. The second circuitry 240 of the first battery cell charge equalization circuit 220 may use the third threshold to activate a monitor output and to activate the fourth threshold. The third circuitry 250 of the first battery cell charge equalization circuit 220 may use the fifth threshold to activate an overcharge output and to activate the sixth threshold. At the same time, that is during a same charging cycle of the battery 202, the first circuitry 231 of the second battery cell charge equalization circuit 221 may use a seventh threshold (which may be different than or the same as the first threshold) to direct a portion of the charging current away from the second battery cell 207 and to activate an eighth threshold (which may be different than or the same as the second threshold). The second circuitry 241 of the second battery cell charge equalization circuit 221 may use a ninth threshold (which may be different than or the same as the third threshold) to activate a monitor output and to activate the tenth threshold (which may be different than or the same as the fourth threshold). The third circuitry 251 of the second battery cell charge equalization circuit 221 may use an eleventh threshold (which may be different than or the same as the fifth threshold) to activate an overcharge output and to activate the twelfth threshold (which may be different than or the same as the sixth threshold). Likewise, the third and fourth battery cell charge equalization circuits 222 and 223 may use thresholds that are the same as or different than the thresholds used by the first and second battery cell charge equalization circuits 220 and 221.

The battery cell charge equalization circuits 220-223 may also include switches 280-283 and 285-288. The switches 280-283 and 285-288 may be closed during charging of the battery 202 to provide power to the battery cell charge equalization circuits 220-223. The switches 280-283 and 285-288 may be opened during storage or use of the battery 202 to reduce current flow through the battery cell charge equalization circuits 220-223 so that the battery cell charge equalization circuits 220-223 do not increase the rate of self-discharge of the battery 202 and of the battery cells 206-209. In a particular embodiment, the switches 280-283 and 285-288 may be controlled via on/off and return inputs 270, 272 of the battery cell charge equalization system 224.

Although FIG. 2 illustrates particular values of the voltage thresholds, the voltage thresholds could have other values in other embodiments. For example, while the fully charged voltage of a particular lithium-ion battery may be about 4.10V, other types of batteries or other lithium-ion batteries may have other fully charged voltages. Further, for particular uses, such as to extend the battery life, a lower voltage may be designated as the fully charged voltage. To illustrate, for certain applications the fully charged voltage of a lithium-ion battery may be set at about 3.92V to extend the life of the lithium-ion battery. Other thresholds may also be selected depending on the type of battery (including the specific materials used to construct the battery), the application for which the battery is to be used (e.g., the specific type or nature of the load 210, the operating environment of the battery 202, etc.), other operating constraints to which the battery 202 is subject (e.g., regulatory constraints or other specifications), other characteristics of the charger 212, the battery 202, the load 210, or any combination thereof.

Figure 3:
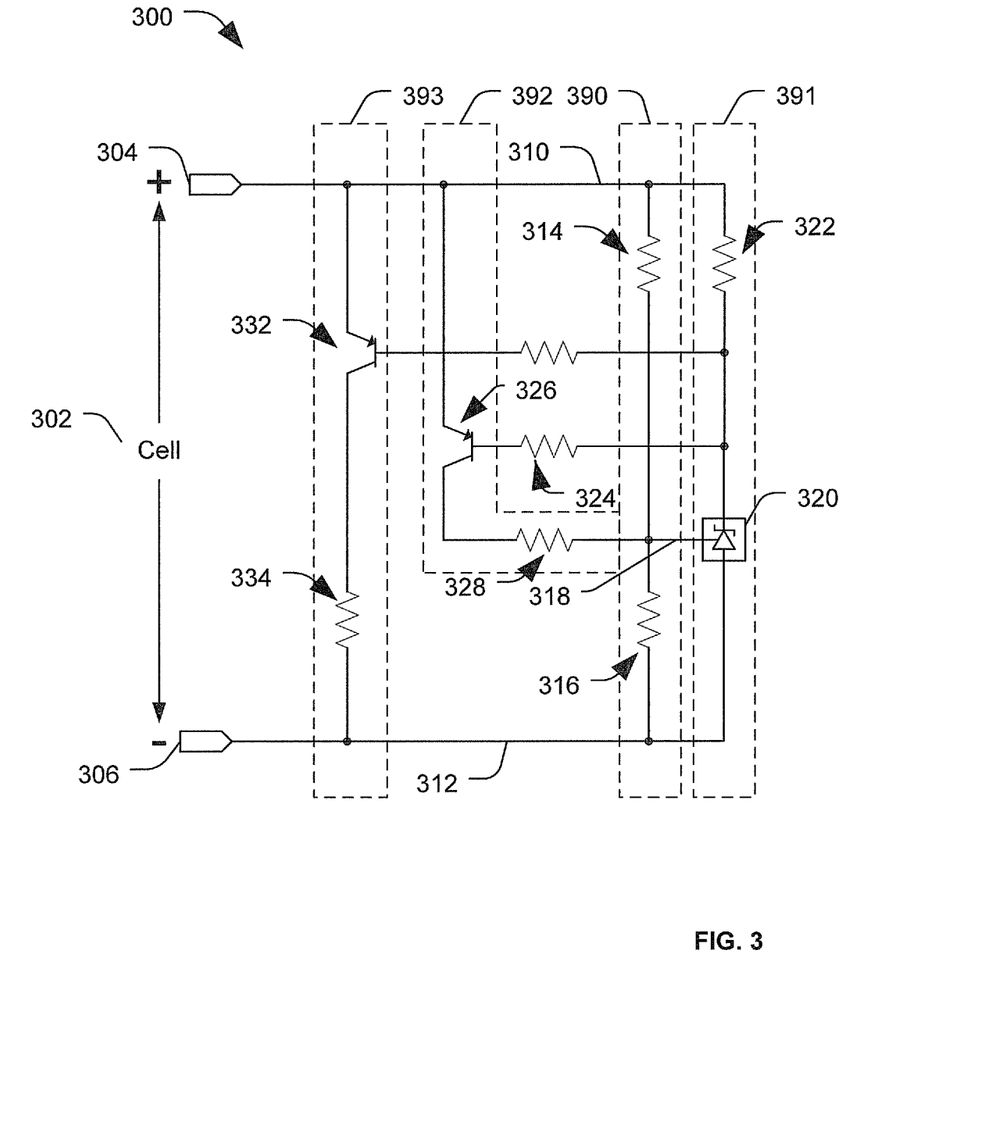
FIG. 3 is a schematic diagram of a first particular embodiment of battery cell charge equalization circuitry.

FIG. 3 is a schematic diagram of a first particular embodiment of battery cell charge equalization circuitry, designated 300. In a particular embodiment, the circuitry 300 may be used to facilitate battery cell charge equalization. For example, the circuitry 300 may be used as the first circuitry 104 of FIG. 1. In FIG. 3, the circuitry 300 is illustrated as coupled to a battery cell 302. The battery cell 302 includes a positive terminal 304 and a negative terminal 306 that may be connected to other battery cells in series to form a battery pack. An input 310 of the circuitry 300 may be coupled to the positive terminal 304 of the battery cell 302, and a return 312 may be coupled to the negative terminal 306 of the battery cell 302. Other components that are not shown may also be present. For example, the circuitry 300 may be coupled to the battery cell 302 via a switch, such as the switch 124 of FIG. 1. To clarify which particular portions of the circuitry 300 are being described, individual portions of the circuitry 300, called "circuit paths" herein, are designated using dashed boxes in FIG. 3. The dashed boxes are used to simplify and clarify the description and should not be interpreted as limitations of the circuitry 300.

Figure 6:
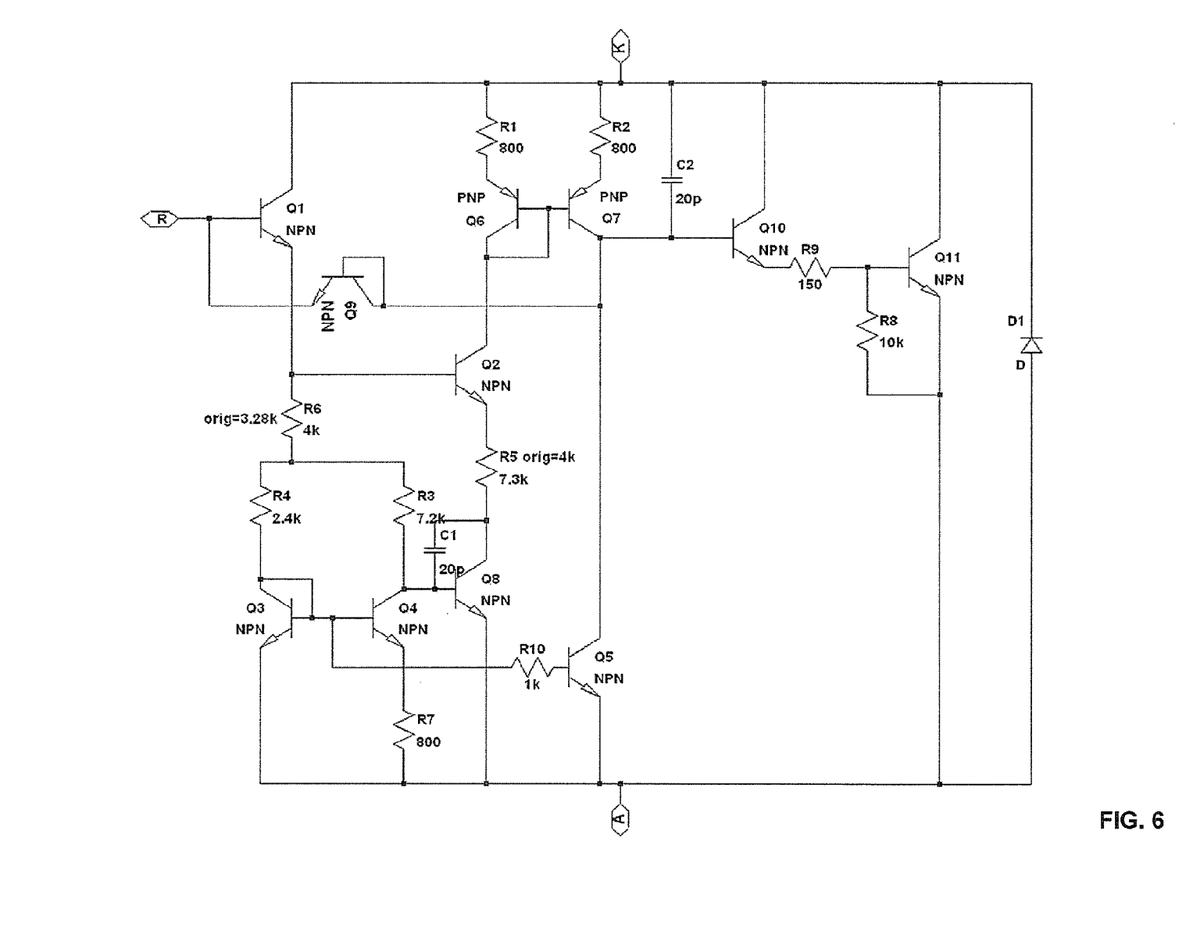
FIG. 6 is an equivalent schematic diagram of a particular voltage reference device that may be used in various embodiments.

The circuitry 300 includes a first resistive element 314 (e.g., a first resistor) and a second resistive element 316 (e.g., a second resistor) that form a voltage divider. A voltage divider output 318 of the voltage divider is coupled to a reference voltage input of a voltage reference device 320. In a particular embodiment, the voltage reference device 320 includes a high-precision voltage reference, such as the TL1431 precision programmable reference available from Texas Instruments Incorporated. Note that while in the particular embodiment illustrated in FIG. 3, the voltage reference device 320 is illustrated using a symbol similar to the symbol commonly used to designate a zener diode, the voltage reference device 320 is not merely a zener diode. Rather, the voltage reference device 320 is a high-precision, stable (e.g., stable over a range of operating temperatures) voltage reference, that provides an output voltage in response to an input reference voltage. FIG. 6 illustrates an equivalent schematic diagram of a particular embodiment of a voltage reference device that may be used as the voltage reference device 320 of FIG. 3. In a particular embodiment, the voltage reference device 320 includes a 2.5V band-gap reference.

Resistance of the first and second resistive elements 314 and 316 (or impedance when the first and second resistive elements 314 and 316 are not purely resistive) is selected so that the voltage divider output 318 turns on the voltage reference device 320 when a first voltage threshold is satisfied. That is, when current flows through an initial circuit path 390 including the voltage divider and when the voltage between the input 310 and the return 312 satisfies the first voltage threshold, the voltage divider output 318 is sufficient to turn on the voltage reference device 320. For example, when the voltage reference device 320 is a 2.5V band-gap reference, the voltage divider output 318 may be at least 2.5V when the first voltage threshold is satisfied.

When the voltage reference device 320 turns on, current flows through a first circuit path 391 that includes a third resistive element 322 and the voltage reference device 320. In response to the current flow in the first circuit path 391, a first switching element 326 (such as a transistor) may be turned on. For example, the current flow through the first current path 391 may apply a current to the base of a transistor (e.g., the first switching element 326), which may activate (i.e., allow current to flow through) a second circuit path 392 that includes the first switching element 326 and a fourth resistive element 328.

The second circuit path 392 may be arranged such that the fourth resistive element 328 is in parallel with the first resistive element 314 in the voltage divider. Accordingly, when the second circuit path 392 is activated, a voltage divider ratio of the voltage divider is modified (effectively forming a second voltage divider). The resistance (or impedance) of the fourth resistive element 328 may be selected to implement or otherwise set a second voltage threshold of the circuitry 300. To illustrate, the resistance of the fourth resistive element 328 may be selected so that voltage divider output 318 drops below an activation voltage of the voltage reference device 320 when the voltage between the input 310 and the return 312 satisfies the second voltage threshold.

For example, using the particular voltage thresholds described as examples with reference to FIG. 1, the first voltage threshold may be 4.05V and the second voltage threshold may be 4.00V. Further, the voltage reference device 320 may have an activation voltage of 2.5V. That is, the voltage reference device 320 may turn on when a voltage of 2.5V is present at the voltage divider output 318. In this example, values of the first resistive element 314 and the second resistive element 316 may be selected to provide a first voltage divider ratio. The first voltage divider ratio may be selected to cause the voltage divider output 318 to be 2.5V when the voltage between the input 310 and the return 312 is 4.05V (the first voltage threshold). Thus, when the first voltage threshold is satisfied, the voltage reference device 320 may turn on and allow current to flow to the base of the first transistor (i.e., the first switching element 326). In response, the first transistor may allow current flow through the fourth resistive element 328, modifying the voltage divider to have a second voltage divider ratio. The second voltage divider ratio is selected such that the voltage divider output 318 drops below 2.5V (i.e., turns off the voltage reference device 320) when the voltage between the input 310 and the return 312 drops below 4.00V.

When current flows through the first circuit path 391, a second switching element 332 may also be activated. For example, current may be applied to a base of a second transistor (e.g., the second switching element 332) to activate a third circuit path 393. The third circuit path 393 may route at least a portion of a charging current away from the battery cell 302. For example, the third circuit path 393 may route the portion of the charging current to a lossy circuit element 334 (such as the shunt 116 of FIG. 1). Thus, a rate of charging of the battery cell 302 may be reduced to allow other battery cells (not shown) to catch up to a state of charge of the battery cell 302. Additionally, since the circuitry 300 by its operation automatically switches between a first voltage threshold and a second voltage threshold, the circuitry 300 provides threshold hysteresis, which can reduce nuisance tripping of the circuitry 300.

In a particular embodiment, after the voltage of the battery cell 302 ceases to satisfy the second voltage threshold (e.g., during use or storage of the battery), the first voltage threshold is reactivated and the second voltage threshold is deactivated. For example, when the voltage drops below the second voltage threshold, the voltage reference device 320 may turn off as a result of the voltage divider output 318 dropping below a minimum voltage input of the voltage reference device 320. When the voltage reference device 320 turns off, current flow in the first circuit path 391 may cease. Accordingly, the first switching element 326 may deactivate, and current flow in the second circuit path 392 may cease; thereby removing the fourth resistive element 328 from the voltage divider. Thus, the voltage divider is reset to include the first resistive element 314 and the second resistive element 316, but not the fourth resistive element 328. Also in response to the current flow ceasing in the first circuit path 391, the second switching element 332 may deactivate, and current flow in the third circuit path 393 may cease.

Figure 4:
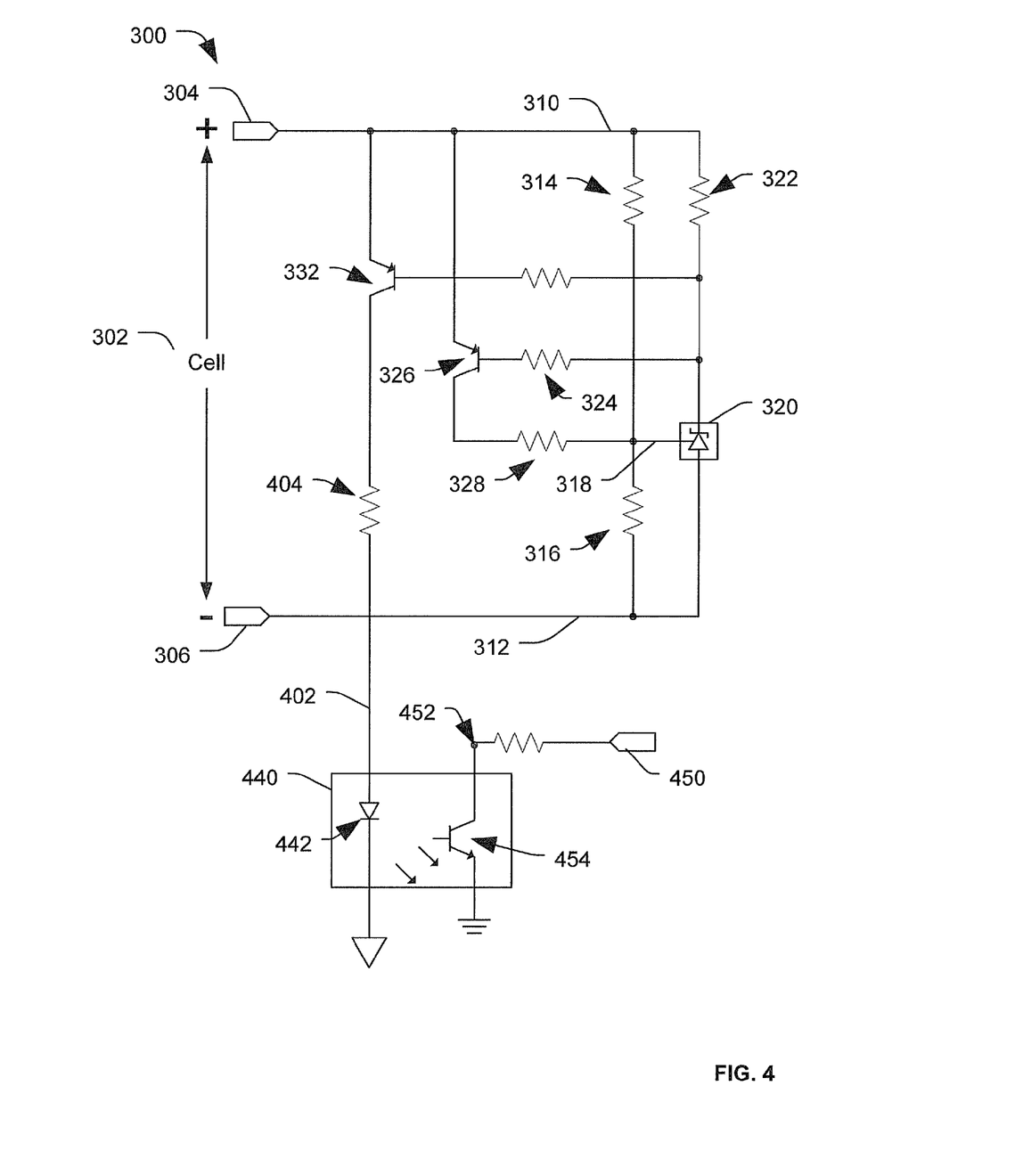
FIG. 4 is a schematic diagram of a second particular embodiment of battery cell charge equalization circuitry.

FIG. 4 is a schematic diagram of a second particular embodiment of battery cell charge equalization circuitry. FIG. 4 illustrates the circuitry 300 with an output 402 coupled to a monitoring system to facilitate battery cell SOC or overcharge monitoring. Elements with the same reference numerals in FIGS. 3 and 4 function as described with reference to FIG. 3. As is described with reference to FIGS. 1 and 2, voltage thresholds used for monitoring a SOC of the battery cell 302 or an overcharge state of the battery cell 302 may be different than voltage thresholds used for battery cell charge equalization. Accordingly, values of the resistive elements 314, 316 and 328 that form the voltage dividers may be selected based on the specific voltage thresholds.

When current flows in the third circuit path through the second switching element 332, the current is routed to the output 402. In this embodiment, no high loss shunt is present, although a restive element 404 may used. The output 402 may be provided to a monitoring system.

In a particular embodiment, an isolation system may be used to isolate the circuitry 300 from the monitoring system. For example, an optical isolator 440 may be used. The optical isolator 440 may allow the monitoring system and the circuitry 300 to be separated by large potentials, e.g., hundreds of volts. The optical isolator 440 may produce an output signal 452 based on the output 402 of the circuitry 300 and a supply voltage 450. To illustrate, the optical isolator 440 may include a photosensor element 454 (e.g., a photosensitive diode) and a light emitting diode (LED) 442 responsive to the output 402. The LED 442 may generate light that is detectable by the photosensor element 454. When the LED 442 generates light in response to the output 402, the photosensor element 454 may detect the light and generate the output signal 452. Thus, the circuitry 300 and the monitoring system may communicate while remaining electrically isolated from one another.

Figure 5:
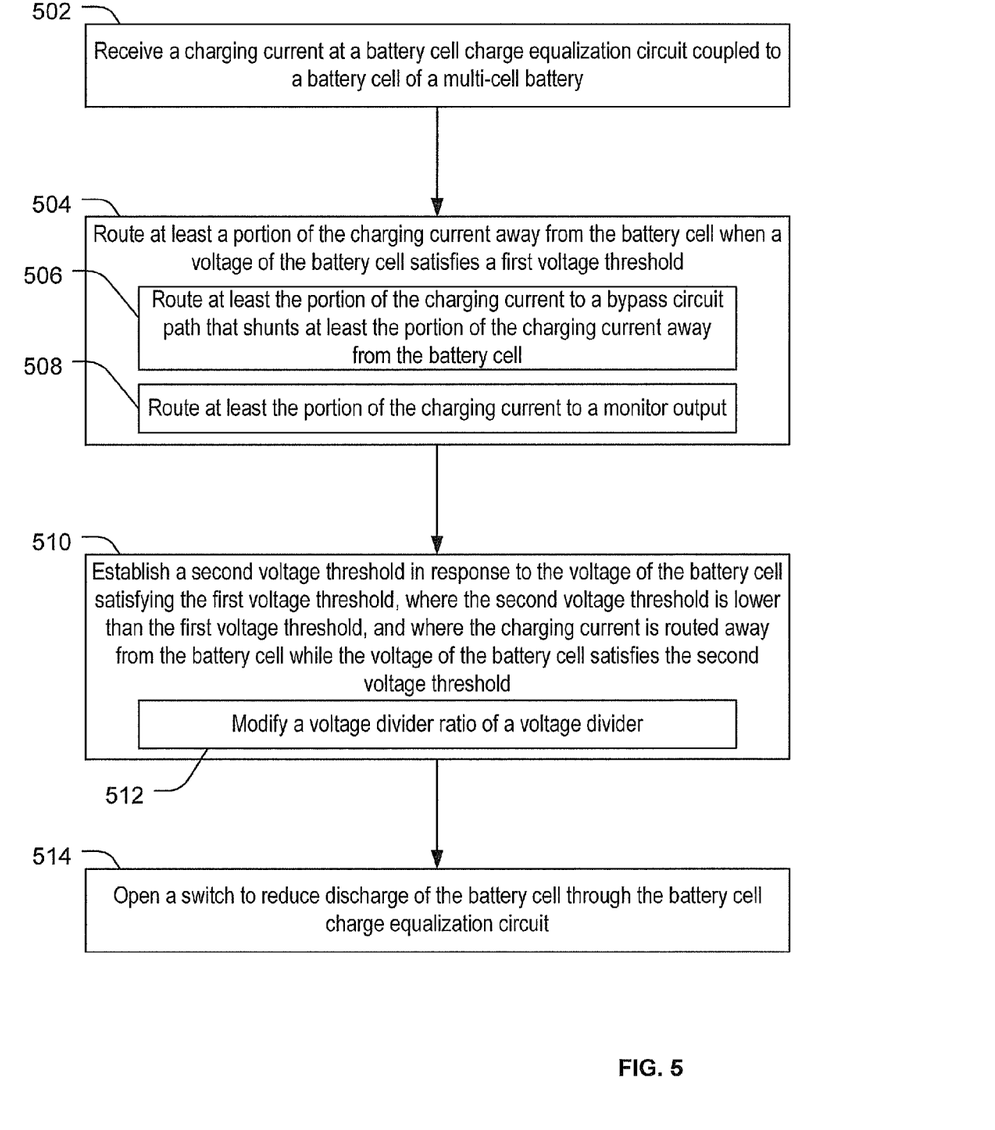
FIG. 5 is a flowchart of a particular embodiment of a method of battery cell charge equalization.

FIG. 5 is a flowchart of a particular embodiment of a method of battery cell charge equalization. The method may be implemented using one or more of the circuits illustrated in FIGS. 1-4.

In a particular embodiment, the method includes, at 502, receiving a charging current at a battery charge equalization circuit coupled to a battery cell of a multi-cell battery. The method may also include, at 504, routing at least a portion of the charging current away from the battery cell when a voltage of the battery cell satisfies a first voltage threshold. For example, at least the portion of the charging current may be routed to a bypass circuit path that shunts at least the portion of the charging current away from the battery cell, at 506. In another example, at least the portion of the charging current may be routed to a monitor output, at 508.

The method may also include, at 510, establishing a second voltage threshold in response to the voltage of the battery cell satisfying the first voltage threshold. The second voltage threshold may be lower than the first voltage threshold. For example, as described with reference to FIG. 1, the first voltage threshold may be 4.05V and the second voltage threshold may be 4.00V. In another example that was described with reference to FIG. 1, the first voltage threshold may be 4.10V and the second voltage threshold may be 4.05V. In yet another example that was described with reference to FIG. 1, the first voltage threshold may be 4.30V and the second voltage threshold may be 4.10V. At least a portion of the charging current may be routed away from the battery cell while the voltage of the battery cell satisfies the second voltage threshold.

In an illustrative embodiment, the first and second voltage thresholds may be implemented using a voltage divider. For example, an output of the voltage divider may be coupled to a voltage reference device. The voltage reference device may enable current flow in a first circuit path when the first voltage threshold is satisfied. The current flow in the first circuit path may cause a voltage divider ratio of the voltage divider to be modified. The second voltage threshold may be established by modifying the voltage divider ratio of the voltage divider, at 512. The current flow in the first circuit path may also enable routing of at least the portion of the charging current away from the battery cell.

In a particular embodiment, the method may include, at 514, opening a switch after charging the multi-cell battery. Opening the switch may reduce discharge of the battery cell through the battery cell charge equalization circuit to a rate less than the battery cell's self-discharge rate.

Particular embodiments disclosed herein can use commonly available integrated circuits and discrete components to provide fast, reliable detection of the state of charge (SOC) of battery cells and, at the same time, reduce nuisances associated with noisy output signals for monitoring and cell charge equalization shunt circuits. A switch may be provided to isolate a battery cell charge equalization circuit from the battery cell to reduce parasitic discharge of the battery cell through the battery cell charge equalization circuits. The switch may also reduce "hot mate" concerns. The battery cell charge equalization circuit may be readily available and rugged. For certain applications, the battery cell charge equalization circuit can be radiation hardened, for example, for use in space.

Battery cell charge equalization systems disclosed herein can be self contained. That is, no other resources (e.g., computers or software) are needed to implement battery cell charge equalization. Shunting charging current away from the battery cell over multiple cycles allows lower SOC cells to catch up when near full charge. Additionally, the battery cell charge equalization systems can be customized for particular applications. For example, thresholds and threshold hysteresis can be customized for particular batteries or applications through selection of voltage divider elements.

In a particular embodiment, thresholds used by the battery cell charge equalization systems disclosed herein may be dynamically adjustable. For example, referring to FIG. 3, the resistive elements 314, 316 and 328 that make up the voltage dividers used to set the thresholds may be variable resistors that are responsive to a control input. Thus, a monitoring or control system may provide the control input to adjust resistance of one or more of the resistive elements 314, 316 and 328 to adjust one or more of the thresholds. For example, one or more of the thresholds may be dynamically adjusted to compensate for changing operational conditions, aging of one or more of the cells, or damage to one or more of the cells. In another example, one or more of the thresholds may be adjusted during an initial configuration of the battery to compensate for minor manufacturing or functional differences between the cells. To illustrate, thresholds used for each cell of a battery may be adjusted after the cells are assembled to form the battery in order to tune the performance of the battery.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system comprising:
a battery comprising a plurality of battery cells coupled in series;
first circuitry to monitor a voltage of a first battery cell, wherein the first circuitry compares the voltage of the first battery cell to a voltage threshold, wherein the voltage threshold has an initial value equal to a first value, wherein, in response to applying a charging current to the battery, the first circuitry routes at least a portion of the charging current to bypass the first battery cell in response to the voltage of the first battery cell satisfying the voltage threshold, wherein the first circuitry dynamically activates a divider circuit in response to the voltage of the first battery cell satisfying the voltage threshold, wherein activating the divider circuit changes the voltage threshold to a second value by changing a voltage divider ratio of a voltage divider of the first circuitry, and wherein the second value is lower than the first value; and
second circuitry to monitor the voltage of the first battery cell, wherein, in response to applying the charging current to the battery, the second circuitry generates a monitor output in response to the voltage of the first battery cell satisfying a monitor threshold, wherein the monitor threshold is equal to a third value, and wherein the third value is higher than the first value.

2. The system of claim 1, wherein the second circuitry changes the monitor threshold to a fourth value in response to the voltage of the first battery cell satisfying the monitor threshold, wherein the fourth value is lower than the third value and the monitor output is generated while the monitor threshold is satisfied.

3. The system of claim 1, wherein the first circuitry ceases to route at least the portion of the charging current to bypass the first battery cell in response to the voltage of the first battery cell ceasing to satisfy the voltage threshold.

4. The system of claim 3, wherein after the voltage of the first battery cell ceases to satisfy the voltage threshold, the voltage threshold changes to the first value.

5. The system of claim 1, further comprising third circuitry to monitor the voltage of the first battery cell, wherein, in response to applying the charging current to the battery, the third circuitry generates a second monitor output in response to the voltage of the first battery cell satisfying a second monitor threshold, wherein the second monitor threshold is equal to a fifth value, and wherein the fifth value is higher than the third value.

6. The system of claim 5, wherein the charging current to the first battery cell is discontinued in response to the second monitor output.

7. The system of claim 5, wherein the third circuitry changes the second monitor threshold to a sixth value in response to the voltage of the first battery cell satisfying the second monitor threshold.

8. The system of claim 1, further comprising a first switch between the first battery cell and the first circuitry and the second circuitry, the first switch operable to reduce discharge of the first battery cell through the first circuitry and the second circuitry after the charging current is disconnected from the battery.

9. The system of claim 8, further comprising:
third circuitry to monitor the voltage of the first battery cell, wherein, in response to applying the charging current to the battery, the third circuitry generates a second monitor output in response to the voltage of the first battery cell satisfying a second monitor threshold, wherein the second monitor threshold is equal to a fifth value, and wherein the fifth value is higher than the third value; and a second switch between the first battery cell and the third circuitry, the second switch operable to reduce discharge of the first battery cell through the third circuitry after the charging current is disconnected from the battery.

10. The system of claim 1, further comprising:

at least one second battery cell coupled in series with the first battery cell;

fourth circuitry coupled to the at least one second battery cell to monitor a second voltage of the second battery cell, the fourth circuitry having a second voltage threshold initially equal to a seventh value, wherein, in response to applying the charging current to the battery, the fourth circuitry routes at least a second portion of the charging current to bypass the at least one second battery cell in response to the second voltage of the at least one second battery cell satisfying the second voltage threshold, wherein the fourth circuitry dynamically activates a second divider circuit in response to the second voltage of the at least one second battery cell satisfying the second voltage threshold, wherein activating the second divider circuit changes the second voltage threshold to an eighth value, and wherein the eighth value is lower than the seventh value; and fifth circuitry to monitor the voltage of the second battery cell, wherein, in response to applying the charging current to the battery the fifth circuitry generates a third monitor output in response to the voltage of the at least one second battery cell satisfying a fifth monitor threshold, wherein the fifth monitor threshold is equal to a ninth value, and wherein the ninth value is higher than the seventh value.

11. A method of battery cell charge equalization, the method comprising:

receiving a charging current at a battery charge equalization circuit coupled to a battery cell of a multi-cell battery;

comparing a voltage of the battery cell to a voltage threshold, wherein the voltage threshold has an initial value equal to first value; and in response to the voltage of the battery cell satisfying the voltage threshold, routing at least a portion of the charging current away from the battery cell by dynamically activating a circuit, wherein dynamically activating the circuit changes the voltage threshold to a second value by changing a voltage divider ratio of a voltage divider of the battery charge equalization circuit, wherein the second value is lower than the first value, and wherein the charging current is routed away from the battery cell while the voltage of the battery cell satisfies the voltage threshold.

12. The method of claim 11, wherein activating the circuit modifies a voltage divider ratio of a voltage divider of the battery charge equalization circuit.

13. The method of claim 12, wherein an output of the voltage divider is coupled to a voltage reference device, wherein the voltage reference device enables current flow in a first circuit path when the voltage threshold is satisfied, and wherein the current flow in the first circuit path enables modifying the voltage divider ratio and enables routing at least the portion of the charging current away from the battery cell.

14. The method of claim 11, wherein routing at least the portion of the charging current away from the battery cell comprises routing at least the portion of the charging current to a monitor output.

15. The method of claim 14, further comprising opening a switch after charging the multi-cell battery, wherein opening the switch reduces discharge of the battery cell through the battery charge equalization circuit.

16. A battery cell charge equalization device comprising:

a voltage reference device coupled to a battery cell, wherein the voltage reference device compares a voltage of the battery cell to a voltage threshold, wherein the voltage threshold has an initial value equal to first value, wherein in response to the voltage of the battery cell satisfying the voltage threshold, the voltage reference device activates, wherein activation of the voltage reference device enables current flow through a first circuit path, and wherein in response to the voltage of the battery cell being below the voltage threshold, the voltage reference device deactivates;

a first switching device coupled to the first circuit path, wherein the first switching device is activated by the current flow through the first circuit path to enable current flow through a second circuit path, wherein the current flow through the second circuit path causes the voltage threshold to change to a second value, and wherein the second value is different than the first value; and a second switching device coupled to the first circuit path, wherein the second switching device is activated by the current flow through the first circuit path to activate a third circuit path, and wherein the third circuit path routes at least a portion of a charging current away from the battery cell.

17. The battery cell charge equalization device of claim 16, wherein the voltage reference device comprises a high-precision band gap voltage reference.

18. The battery cell charge equalization device of claim 16, wherein a reference voltage input of the voltage reference device is electrically coupled to a first voltage divider when the voltage threshold is equal to the first value and is electrically coupled to a second voltage divider while the voltage threshold is equal to the second value, and wherein the second voltage divider includes at least a portion of the first voltage divider.

19. The system of claim 1, wherein the first circuitry includes a switch to selectively change an impedance to dynamically activate the divider circuit.

20. The method of claim 11, wherein the circuit is dynamically activated by activating a switch to change an impedance within the battery charge equalization circuit.

* * * * *